United States Patent [19]

Lungershausen et al.

[11] Patent Number: 5,253,086
[45] Date of Patent: Oct. 12, 1993

[54] HOLOGRAPHIC DEVICE FOR COMBINING LASER BEAMS

[75] Inventors: Arnold W. Lungershausen, West Henrietta; Stephen C. Arnold, Honeoye Falls, both of N.Y.

[73] Assignee: Eastman Kodak Company, Rochester, N.Y.

[21] Appl. No.: 827,651

[22] Filed: Jan. 29, 1992

[51] Int. Cl.$^5$ .......................... G02B 5/32; G02B 27/10; G02B 5/04
[52] U.S. Cl. .......................................... 359/10; 359/1; 359/15; 359/618; 359/831; 359/28
[58] Field of Search .................. 359/7, 3, 10, 11, 28, 359/29, 32, 35, 618, 831, 15; 430/1, 2

[56] References Cited

U.S. PATENT DOCUMENTS

| | | | |
|---|---|---|---|
| 3,623,798 | 11/1971 | Sheridon | 359/8 |
| 4,626,679 | 12/1986 | Kuwayama et al. | 250/227.11 |
| 4,908,285 | 3/1990 | Kushibiki et al. | 430/1 |
| 4,960,314 | 10/1990 | Smith et al. | 359/15 |
| 5,013,107 | 5/1991 | Biles | 359/15 |

OTHER PUBLICATIONS

R. Collier, et al., *Optical Holorgaphy*, Section 13.3.2 at pp. 370-373, Academic Press (1971).
H. Kogelnik, "Holographic Image Projection Through Inhomogenous Media," Bell System Tech. Briefs, vol. 44, pp. 2451-2455 (1965).

*Primary Examiner*—Scott J. Sugarman
*Assistant Examiner*—David R. Parsons
*Attorney, Agent, or Firm*—Stephen C. Kaufman; Warren Locke Franz; Kevin A. Sembrat

[57] ABSTRACT

A holographic recording of the interference between an object laser beam and a reference laser beam is used to combine the amplitudes of multiple input laser beams which are conjugates of the reference beam, into a single output laser beam which is a conjugate of the object beam. An optical device in the form of a trapezoidal prism has an entrance top face with a diffusion surface, and an exit base face with a holographic recording made on a light sensitive recording medium of an interference pattern of an object beam incident on the diffusion surface and scattered over the recording medium, in interference with a reference beam simultaneously incident to a side of the prism onto the same medium. Multiple beams, conjugate to the reference beam, are positioned to be incident on the holographic recording, the hologram being configured to diffract the multiple beams and cause them to be combined at the diffusion surface to form a single output beam, conjugate to the original object beam and having an amplitude which is proportional to the sum of the separate amplitudes of the combined beams.

12 Claims, 3 Drawing Sheets

HOLOGRAPHIC DEVICE FOR COMBINING LASER BEAMS

BACKGROUND OF THE INVENTION

This invention relates to a novel holographic device that is suitable for combining multiple laser beams into a single, combined amplitude laser beam.

INTRODUCTION OF THE INVENTION

A basic theory on holographic devices and methods for holographic recording and reconstructing, is known. Reference may be made, for example, to Goodman, J. S.: Introduction to Fourier Optics, Chap. 8, McGraw-Hill Book Company, New York, 1968; Meyer-Arendt, J. R.: Introduction to Classical and Modern Optics, Chap. 4.4, Prentice-Hall, Inc., Englewood Cliffs, N.J., 1972; or, Collier, R. J. et al: Optical Holography, Chap. 1, Academic Press, New York, 1971.

SUMMARY OF THE INVENTION

Our work is to extend and exploit the potentialities of application inherent in a theoretical elaboration of holography. To this end, we now disclose a novel holographic device that is suitable in methods for holographically combining multiple laser beams into a single, combined amplitude laser beam.

The novel holographic device of the present invention comprises:

a) a support substrate having entrance and exit faces and comprising a monolithic element;

b) means providing a diffusion surface on the entrance face;

c) means providing a holographic recording on the exit face, the recording comprising a holographic recording made on light sensitive recording medium of an interference pattern of an object laser beam propagated through the diffusion surface and the substrate onto the medium, combined with a reference laser beam directed at an angle into the substrate onto the same medium, each part of the diffusion surface acting to spread the object beam to all parts of the medium; and;

d) means directing a plurality of input laser beams, which are conjugates of the reference laser beam, onto the holographic recording and into the substrate, the substrate, diffusion surface and holographic recording being relatively dimensioned, configured and adapted so that a conjugate of the object beam is reconstructed by each conjugate reference laser beam and the separately reconstructed conjugates of the object beam combine to produce a single output laser beam having an amplitude corresponding to and combined amplitudes of the input beams directed onto the recording.

The novel holographic device of the present invention has the advantages of simplicity and efficiency of construction, while realizing stability and robustness in sundry working environments, including, for example, laser film writers/recorders, laser communications (film optics or free space), medical/surgical, or laser fusion.

BRIEF DESCRIPTION OF THE DRAWINGS

The invention is illustrated in the accompanying drawing, in which.

DETAILED DESCRIPTION OF THE INVENTION

Figure 1:
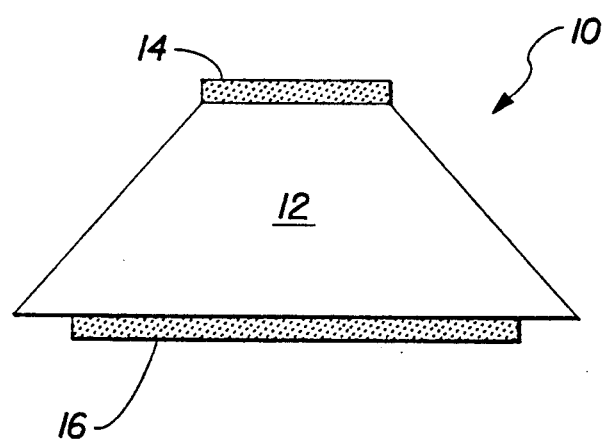
FIG. 1 shows a holographic device of the present invention.

Attention is now directed to FIG. 1, which shows a preferred holographic device 10 of the present invention. In overview, the holographic device 10 comprises a support substrate 12; a support substrate entrance face 14; and, a support substrate exit face 16 comprising a light sensitive recording medium. Individual details on the FIG. 1 holographic device 10 are now disclosed.

The Support Substrate

The support substrate 12 may comprise a conventional light transmissive block, for example, a glass block, or a conventional prism. We employ a prism in a preferred mode, for reasons of support stability, optical properties, and economics. A typical such prism has a length from approximately 7.0 cm. to 8.0 cm.; a depth of approximately 3.0 cm. to 4.0 cm.; a width from approximately 2.5 cm. to 3.5 cm.; and, a weight from approximately 200.0 gm. to 300.0 gm., depending on its ultimate use in a particular holographic recording or reconstructing method. The illustrated device 10 has a trapezoidal cross-section, with parallel top and base sides respectively defining the entrance and exit faces 14, 16; and oppositely slanted sides, joining the top and base sides, and defining faces through which a reference beam can be directed.

The prism preferably functions as a deviating prism, because, as demonstrated below in a method of utility of the holographic device 10, the deviating prism can refract a reference beam at an appropriate angle.

A suitable prism may comprise a dove prism, although, for example, a Porro prism or a right angle prism may be used.

A suitable prism may be a polarizing prism.

The prism may comprise glass or a crystalline substrate.

A selection of one such particularly characterized prism depends, ultimately, on its use in a particular holographic recording or reconstructing method.

The Entrance Face

The support substrate 12 defines the entrance face 14. A diffusion surface is provided on the entrance face 14 which may comprise a scattering medium or, alternatively, it may comprise a periodic structure. For either alternative, the diffusion surface on entrance face 14 functions so that all components of the entrance face 14 provide illumination to a common area i.e., a pupil of the exit face 16.

Preferably, the scattering medium comprises ground glass, that may be etched or abraded by conventional techniques directly on the support substrate 12. This action creates a diffusing surface.

Alternatively, one may attach, for example, by way of a conventional optical cement, a discrete ground glass entity, to the support substrate 12, so as to construct a monolithic device.

The scattering medium may comprise an array of point scatterers, or a light sensitive recording medium, for example, a photographic film. These alternative scattering media comprise a diffusing surface that is integral to the holographic device 10.

As just referenced, the entrance face 14 may alternatively comprise a periodic structure, for example, an array of microlenses, or an array of pinhole apertures, or an array of diffractive optical elements. The term "diffusing surface" as used herein contemplates such periodic structure, as well.

Note that for all cases, (i.e., periodic or scattering), an index of refraction of the entrance face 14 is preferably the same as that of the support substrate 12.

The Exit Face

The support substrate 12 defines the exit face 16 which is provided with a light sensitive recording medium.

The light sensitive recording medium may comprise a photoresistive material, or a silver halide, or a dichromated gelatin, or a photo polymer, or a thermoplastic.

The light sensitive recording medium may be applied to the support substrate 12 by way of a conventional coating process, which inherently adheres to the support substrate 12 so that it becomes integral to the holographic device 10, or it may be coated on a separate substrate that is later adhered to the support substrate 12.

Figure 2A:
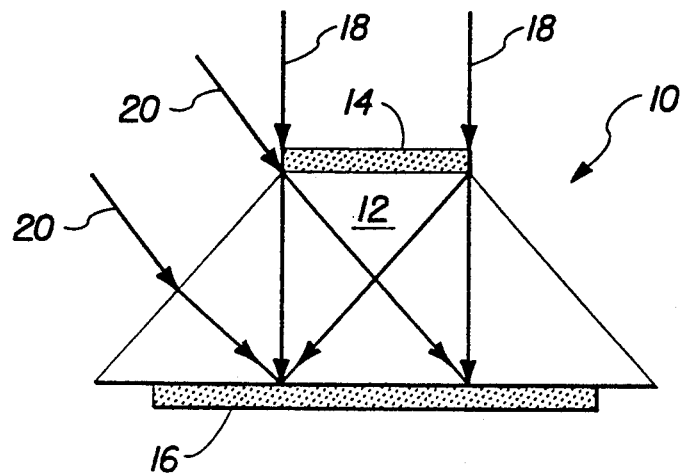
FIGS. 2A, 2B show the holographic device of FIG. 1 used for holographic recording and reconstructing, respectively.
Figure 2B:
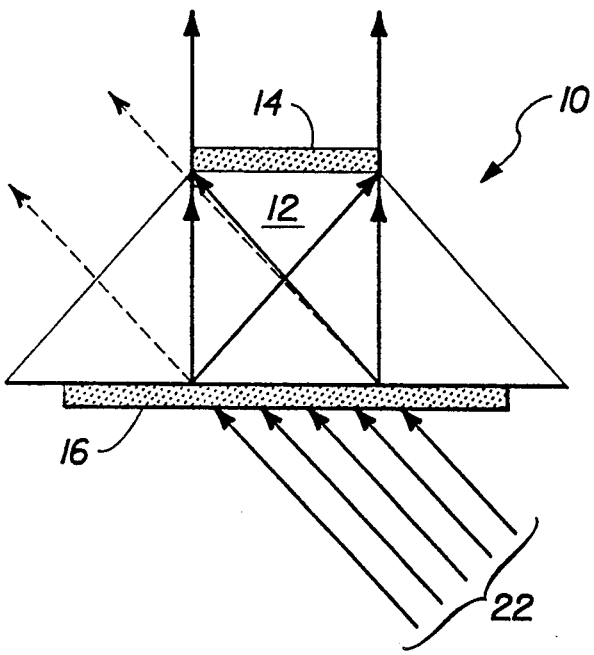

Attention is now directed to FIGS. 2A, 2B, which illustrate a utility of the holographic device 10 in a holographic laser beam combining method.

In particular, FIG. 2A illustrates an initial recording of a hologram of the diffusing surface 14. Each diffusing element of the diffusing surface 14 spreads an incident input (object) beam 18 over the whole area of the recording. A reference beam 20 is added to form an interference pattern on the recording material 16.

Note that since each diffusing element is spread over the entire hologram area, upon reconstruction, each element of the hologram can reconstruct the entire diffusing area, and the beam that illuminates it. If, for example, a collimated beam is used to illuminate the diffusing surface during recording, then a collimated beam is reconstructed in a subsequent reconstructing step. This only works if an exact conjugate (time reversed) version of the original reference beam is used.

FIG. 2B illustrates a reconstructing step of the FIG. 2A hologram. Note, in particular, that FIG. 2B shows a step of directing a plurality of conjugate reference beams 22 from lasers 23 to the holographic recording. This action is that of a holographic beam combiner, whereby, for example, one can provide a laser writer generating several times the power available from a single high power diode laser.

Note, furthermore, that the holographic device 10 can be constructed to act as a beam intensity profile converter/transformer.

Note, finally, that a step of selectively combining sundry of the plurality of conjugate reference beams 22, can reconstruct the input (object) beam in accordance with predetermined intensity levels, thereby functioning as an optical digital to analog converter (i.e., an optical DAC).

These capabilities are now expanded upon, by way of a following mathematical disclosure.

HOLOGRAPHIC BEAM COMBINER/OPTICAL DAC

I. Recording Step

Assume some two-dimensional input function, in this case a plane wave with Gaussian amplitude $$f_1(x,y) = A_1 \exp[-\pi(x^2+y^2)/d^2]$$

where x and y are spatial coordinates, and the wave is assumed to be traveling along the z axis; and $A_1$ is the wave amplitude; d is the beam diameter.

This input wave impinges on the entrance face with a complex transmission function $$t_1(x,y) = \exp(i\phi)$$

where
$\phi = (2\pi/\lambda) nT$ is the phase;
$\pi$ is the wavelength;
n is the refractive index of the substrate; and
T is the thickness of the substrate.
The impulse response of the scatterer and media is $$h_1 = \exp[(i\pi/T\lambda)(x^2+y^2)].$$

Figure 3:
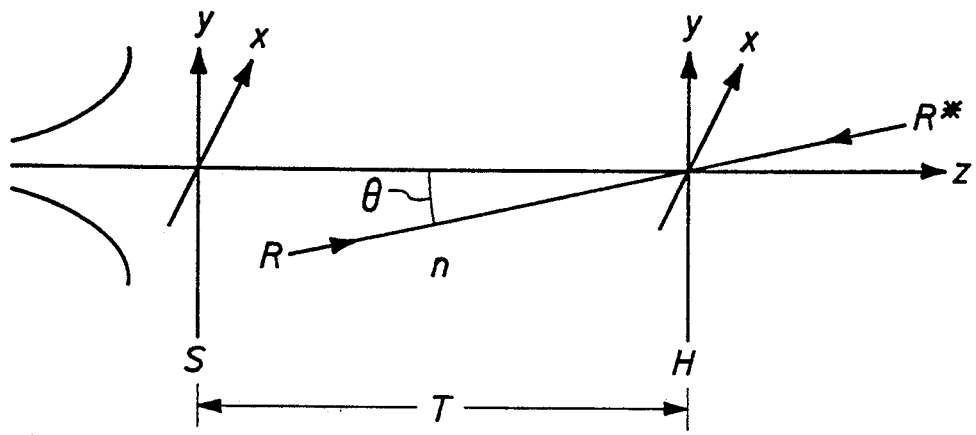
FIG. 3 shows a schematic holographic recording geometry.

This is shown is FIG. 3, where S is the entrance face or input plane for the holographic recording, this is the phase scatterer, and
H is the recording plane;
R is a reference wave; and
R* is a conjugate reference wave.

This device can be modeled as a linear shift invariant system (LSI). It is linear since it abides by the principle of superposition as defined by Gaskill. (*Linear Systems, Fourier Transforms and Optics* by Jack D. Gaskill; John Wiley & Sons, New York, 1978, pp. 137-138.) This essentially says that a linear combination of inputs or stimuli to a system result in a linear combination of outputs or responses from the system. Also understood from this is that the system is "independent of the magnitude of the input." (See Gaskill previously cited, p. 139.) In the recording stage this system is also shift invariant, where shift invariance implies that the only effect caused by a spatial shift in the input is an equal spatial shift in the output.

It is not shift invariant in the reconstruction step, which, as will be shown, is of great advantage. The recording step can be completely characterized by this impulse response, since it is an LSI system.

The complex amplitude of the LSI system is the object wavefront that is recorded in the hologram at H in FIG. 3:

$$f_2(x,y) = f_1(x,y) t_1(x,y) * h_1$$

where $f_2$ is the output and * denotes the convolution operation. The convolution operation really describes the Fresnel diffraction caused by the propagation of the original input wave through the scatterer and ensuing media.

The transfer function associated with Fresnel diffraction is found to be $$H_1(\xi,\eta) = \{h_1(x,y)\}$$

(where $\xi$ and $\eta$ represent spatial frequencies in the x and y directions). This describes the propagation of plane wave components from the input plane to output plane when the Fresnel approximations are valid.

$$F_2(\xi,\eta) = F_1(\xi,\eta) * T_1(\xi,\eta) H_1$$

represents the distribution of plane wave components in the output plane. To record the hologram at plane H, a plane reference wavefront is combined with the object wavefront $F_2(\xi,\eta)$. This is represented as a complex amplitude $$R(x,y) = A_2 \exp(i2\pi x \xi_r)$$

where $\xi_r = (\sin\theta)/\lambda$, and where $\theta$ is an angle the reference beam makes at the hologram plane H. In frequency space this could be written as $$R(\xi,\eta) = A_2 \delta(\xi - \xi_r).$$

The recording medium linearly records the intensity in the resulting interference pattern. This intensity is represented as $$\begin{aligned}I &= [F_2(\xi,\eta) + R(\xi,\eta)][F_2^*(\xi,\eta) + R^*(\xi,\eta)] \\ &= F_2(\xi,\eta)F_2^*(\xi,\eta) + R(\xi,\eta)R^*(\xi,\eta) + \\ &\quad F_2(\xi,\eta)R^*(\xi,\eta) + F_2^*(\xi,\eta)R(\xi,\eta).\end{aligned}$$

II. Reconstruction Step

Assume that the transmittance function of the hologram is proportional to the intensity in the recording interference pattern. Reconstruction of the hologram is achieved by illuminating the hologram with the conjugate of the original reference beam $R^*(\xi,\eta)$.

This results in the following wavefront (see FIG. 4).

Figure 4:
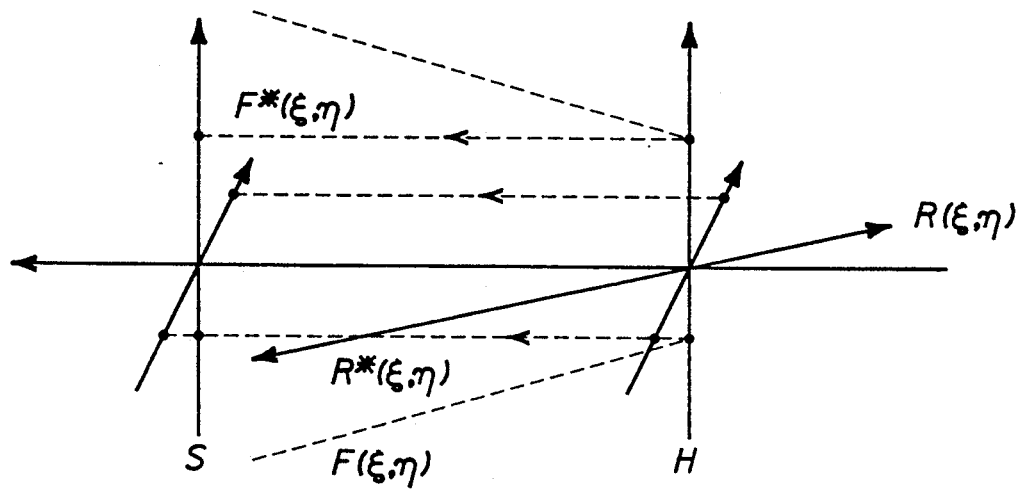
FIG. 4 shows a schematic holographic reconstructing geometry.

In accordance with FIG. 4, we develop the following relationships:

$$\begin{aligned}F_3(\xi,\eta) &= R^*(\xi,\eta)I \\ &= F_2(\xi,\eta)F_2^*(\xi,\eta)R^*(\xi,\eta) + R(\xi,\eta)R^*(\xi,\eta)R^*(\xi,\eta) + \\ &\quad F_2(\xi,\eta)R^*(\xi,\eta)R^*(\xi,\eta) + F_2^*(\xi,\eta)R(\xi,\eta)R^*(\xi,\eta) \\ &= |F_2(\xi,\eta)|^2 R^*(\xi,\eta) + |R(\xi,\eta)|^2 R^*(\xi,\eta) + \\ &\quad F_2(\xi,\eta)|R^*(\xi,\eta)|^2 + F_2^*(\xi,\eta)|R(\xi,\eta)|^2\end{aligned}$$

where the first term, $|F_2(\xi,\eta)|^2 R^*(\xi,\eta)$ represents the intensity of the diffracted object wavefront combined with a background conjugate reconstruction wave.

The second term, $|R(\xi,\eta)|^2 R^*(\xi,\eta)$ is the intensity of the reference wave with a DC reconstruction beam component.

The third term, $F_2(\xi,\eta)|R(\xi,\eta)|^2$ is the diverging virtual image of the diffracted object wavefront plus conjugate reference intensity.

The fourth term, $F_2^*(\xi,\eta)|R(\xi,\eta)|^2$ is the conjugate object wavefront which converges to the plane of the scatterer along with background reference wave intensity.

Diffraction from the hologram back toward the plane of the scatterer is simply the reverse process of when the hologram was recorded, so complex conjugates of the original terms are used, i.e., $$F_2^*(\xi,\eta) = F_1^*(\xi,\eta) * T_1^*(\xi,\eta) H_1^*.$$

Inverse Fourier transforming thus becomes $$\mathcal{F}^{-1}\{F_2^*(\xi,\eta)\} = f_1^*(x,y) t_1^*(x,y) * h_1^*$$

where $\mathcal{F}^{-1}$ denotes an inverse Fourier transform. Next, we substitute the conjugates of the original functions $$f_1^*(x,y) t_1^*(x,y) * h_1^* = A_1 \exp[\pi(x^2+y^2)/d^2]\exp(-i\phi) \cdot \\ \cdot \exp[(-i\pi/T\lambda)(x^2+y^2)].$$

When this is recombined with the original phase scatterer, the transmittance functions cancel. The impulse response of the system will also cancel the initial recorded impulse response. This leaves only the conjugate of the original Gaussian wave function $$\begin{aligned}&A_1 \exp[\pi(x^2+y^2)/d^2]\exp(-i\phi) \cdot \\ &\exp(i\phi) \cdot \exp[(-i\pi/T\lambda)(x^2+y^2)]\exp[(i\pi/T\lambda)(x^2+y^2)] \\ &= A_1 \exp[\pi(x^2+y^2)/d^2].\end{aligned}$$

The conjugate of the original wavefront emerges from the system in a time reverse manner. It should be noted that in the reconstruction or end use stage of this device, it still behaves in a linear manner, yet is not shift invariant; i.e. a change in the angle of incidence of the reconstruction beam (the conjugate of the reference) or in its size or position on the recorded hologram surface, will not effect similar changes in the reconstructed wavefront. The conjugate output is invariant to the position of the reconstructing wavefront(s) in the sense that the output is constant in spatial profile.

We claim:

1. A holographic device for combining a plurality of laser beams, comprising:
   a) a light transmissive support substrate having entrance and exit faces and comprising a monolithic block;
   b) means providing a diffusion surface on the entrance face;
   c) means providing a holographic recording on the exit face, the recording comprising a holographic recording made on a light sensitive recording medium of an interference pattern of an object laser beam propagated through the diffusion surface and the substrate onto the medium, combined with a reference laser beam directed at an angle into the substrate onto the medium, the diffusion surface being configured so that each point of the diffusion surface acts to spread the object beam to all parts of the medium; and
   d) means for directing a plurality of input laser beams, which are conjugates of the reference laser beam, onto the holographic recording and into the substrate, for reconstructing a single output laser beam which is a conjugate of the object beam and has an amplitude corresponding to the combined amplitudes of the plurality of input beams.

2. A holographic device according to claim 1, wherein the support substrate comprises a block of glass.

3. A holographic device according to claim 1, wherein the support substrate comprises a prism having a trapezoidal cross-section.

4. A holographic device according to claim 3, wherein the support substrate comprises a deviating prism.

5. A holographic device according to claim 1, wherein the support substrate comprises a crystalline substrate.

6. A holographic device according to claim 1, wherein the diffusion surface comprises a ground glass.

7. A holographic device for combining a plurality of laser beams, comprising:

a block of light transmissive material defining a scattering plane spaced from a recording plane;

means disposed in the scattering plane defining a diffusing surface having the characteristic that all points of the diffusing surface will spread an object laser beam, directed through the diffusing surface and the block toward the recording plane, over a common pupil area of the recording plane;

a holographic recording disposed in the recording plane; the recording comprising a hologram developed on a light sensitive recording medium, the hologram being a hologram of a spatial intensity profile of an interference pattern of the object laser beam directed through the diffusing surface and spread over the common pupil area, in interference with a reference beam directed at a first angle in a first direction into the block and onto the recording medium; and means directing a plurality of input laser beams at second angles, substantially the same as the first angle, in second directions opposite to the first direction, onto the recorded hologram and into the block; the input beams comprising time-reversed conjugates of the reference beam; and the hologram and block being configured for directing the input beams back toward the diffusing surface so that they form a single output laser beam which is a time-reversed conjugate of the object beam and has an amplitude corresponding to the combined amplitudes of the input beams.

8. A holographic device as in claim 7, wherein the block comprises a prism having a trapezoidal cross-section with parallel top and base sides, and oppositely slanted diagonal sides joining the top and base sides; the scattering plane is defined by the top side; the recording plane is defined by the base side; and the first angle and first direction are defined as an angle and direction of the reference beam directed to one of the slanted sides.

9. A holographic device as in claim 8, wherein the hologram is a hologram of an interference pattern of a collimated object laser beam.

10. A holographic device as in claim 7, wherein the block is a prism having an entrance face defining the scattering plane and an exit face defining the recording plane, with the diffusing surface of the scattering plane being configured to spread object laser beam light incident on each part of the entrance face over the whole of the exit face.

11. An optical digital-to-analog converter comprising:

a plurality of sources of input laser beams having predetermined intensity levels;

an optical beam combining device defining a scattering plane spaced from a recording plane; means providing a diffusing surface on the scattering plane, the diffusing surface having the property that laser light directed toward the recording plane through the scattering plane and incident on any part of the diffusing surface will be spread over the whole of the recording surface; and means providing a holographic recording on the recording plane, the recording being a holographic recording of an interference pattern of a spatial intensity profile of a wavefront of an object laser beam propagated through the diffusion surface onto the medium combined with a spatial intensity profile of a wavefront of a reference laser beam directed at a first angle in a first direction onto the medium; and means for directing the input laser beams from a selected number of the sources at second angles, substantially the same as the first angle, in second directions opposite to the first direction, onto the recorded hologram; the input beams comprising time-reversed conjugates of the reference beam; and the hologram and block being configured for directing the input beams back toward the diffusing surface to form a single output beam which is a time-reversed conjugate of the object beam, and has an amplitude corresponding to the number of sources selected for directing input beams onto the hologram.

12. An optical digital-to-analog converter as in claim 11, wherein the optical beam combining device further comprises a prism of light transmissive material having a trapezoidal cross-section with parallel top and base sides, and opposite, slanted sides joining the top and base sides; the scattering plane is defined by the top side; the recording plane is defined by the base side; and the first angle and first direction are defined as an angle and direction of a reference beam directed to one of the slanted sides.

* * * * *